US006633706B2

(12) United States Patent
Park

(10) Patent No.: US 6,633,706 B2
(45) Date of Patent: Oct. 14, 2003

(54) METHOD FOR ALIGNING OPTICAL FIBERS WITH A WAVEGUIDE ELEMENT

(75) Inventor: Chansik Park, Daejeon (KR)

(73) Assignee: Phoco Co., Ltd., Daejeon (KR)

( * ) Notice: Subject to any disclaimer, the term of this patent is extended or adjusted under 35 U.S.C. 154(b) by 0 days.

(21) Appl. No.: 09/893,893

(22) Filed: Jun. 29, 2001

(65) Prior Publication Data

US 2002/0001436 A1 Jan. 3, 2002

(30) Foreign Application Priority Data

Jun. 29, 2000 (KR) .................................. 2000-36290

(51) Int. Cl.[7] ................................................ G02B 6/30
(52) U.S. Cl. ............................. 385/49; 385/50; 385/52
(58) Field of Search ........................... 385/49, 50, 52

(56) References Cited

U.S. PATENT DOCUMENTS

| 5,297,228 A | * | 3/1994 | Yanagawa et al. | 385/129 |
| 5,859,942 A | * | 1/1999 | Ueda | 385/49 |
| 5,926,594 A | * | 7/1999 | Song et al. | 385/49 |
| 6,141,366 A | * | 10/2000 | Yoneda | 372/50 |
| 6,160,936 A | * | 12/2000 | You et al. | 385/49 |
| 6,345,139 B1 | * | 2/2002 | Fuse et al. | 385/49 |
| 6,356,687 B1 | * | 3/2002 | Shahid | 385/49 |
| 6,360,043 B1 | * | 3/2002 | Bostock et al. | 385/49 |
| 6,377,732 B1 | * | 4/2002 | Li et al. | 385/49 |

FOREIGN PATENT DOCUMENTS

GB      2191601 A   * 12/1987   ............ G02B/6/36

* cited by examiner

Primary Examiner—Akm Enayet Ullah
Assistant Examiner—Jennifer Doan
(74) Attorney, Agent, or Firm—McGuireWoods LLP

(57) ABSTRACT

The method in accordance with the present invention forms grooves on one side of the waveguide element, wherein the axis of each groove is aligned with the axis of the corresponding waveguide in the waveguide element, and inserts the optical fibers into the grooves. In this way, the present invention provides a method which makes the alignment of the optical fibers with the waveguide element easier, improves the tolerance of the waveguide element to mechanical and environmental factors, and miniaturizes final products including the waveguide element.

17 Claims, 5 Drawing Sheets

METHOD FOR ALIGNING OPTICAL FIBERS WITH A WAVEGUIDE ELEMENT

FIELD OF THE INVENTION

The present invention relates to a method for aligning optical fibers with a waveguide element; and, more particularly, to a method for aligning an optical fiber with a corresponding waveguide of the waveguide element by forming a groove for inserting the optical fiber into the waveguide element, instead of aligning an optical fiber with a waveguide by using an optical fiber block as known in the prior art.

BACKGROUND OF THE INVENTION

One of the points at issue in producing waveguide elements is how to develop a simple method for aligning an optical fiber with a waveguide of the waveguide elements, and many researchers have focused on developing a packaging method insensitive to environmental and mechanical factors.

FIG. 1 illustrates a method for actively aligning an optical fiber with a waveguide, which is generally known in the prior art.

As shown in FIG. 1, optical fiber blocks 3 and 3a are arranged on both sides of a waveguide element 1, and the optical fiber blocks 3 and 3a are aligned with the waveguide element 1 by measuring the intensity of light passing through the waveguide.

One problem of the above mentioned method is that it takes excessive time to align the optical fiber blocks with the waveguide element due to the structural precision error of the waveguide element and the optical fiber blocks. Another problem is that although the waveguide element 1 and the optical fiber blocks 3 and 3a are precisely aligned, its characteristic can be changed due to mechanical and environmental factors.

Further problem arises from the fact that the optical fiber blocks 3 and 3a should be cut to make inclines 4 and 4a at an angle of equal to or more than 8 degrees in order to improve reflection characteristics. In this case, it takes excessive time to align the inclines 4 and 4a, and because it is impossible to polish consistently all of the inclines, the curvature radius of each waveguide is different from each other, so that it is difficult to attach the optical fiber blocks 3 and 3a to the waveguide element 1 in an optimal condition.

Further when the inclines 4 and 4a are butted, the axes of the optical fiber blocks are misaligned with the waveguide element due to the shear stress caused by adhesive being hardened. That is, the displacement δ due to the adhesive stress between the inclines being butted is, $$\delta(\text{deviation}) = \pi d\tau/2G$$

where d is the thickness of the adhesive, τ is a shear stress, and G is a shear modulus of the adhesive.

As shown in the above equation, the displacement of 1 μm results in the loss of 1.8 dB, and when the thickness of the adhesive is reduced, the inclines butted can easily come apart by any mechanical shock.

Another way to align an optical fiber with a waveguide is to insert a thin lens or film made of photosensitive material between the optical fiber and the waveguide. This approach is advantageous in that it is easy to align the optical fiber with the waveguide, and insensitive to the environmental factors. However, this approach has a problem in that the process of manufacturing photosensitive material is difficult, manufacturing cost is high, and optical coupling loss is increased due to the addition of one medium.

SUMMARY OF THE INVENTION

It is, therefore, an object of the present invention to provide a method for aligning an optical fiber with a waveguide, which is insensitive to the environmental and mechanical factors and cost effective.

In accordance with the present invention, there is provided a method for aligning optical fibers with a waveguide element, comprising the steps of: scanning a light source of visible broadband on one side of the waveguide element; capturing an image of the light, which is passing through waveguides in the waveguide element, projected on the other side of the waveguide element; processing the image to convert it into analysis data and storing the analysis data into a computer; forming grooves on one side of the waveguide element, wherein the axes of the grooves are aligned with the axes of the waveguides in accordance with the analysis data; and inserting the optical fibers into the grooves.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

The present invention provides a method for aligning optical fibers with a waveguide element, wherein grooves for inserting the optical fibers are formed on the waveguide element, and the optical fibers are aligned with and inserted into the grooves. In this way, the method in accordance with the present invention makes the alignment of the optical fibers with the waveguide element easier and improves the tolerance of the waveguide element to mechanical and environmental factors.

A groove for inserting an optical fiber can be formed by using laser, mechanical milling tool, or both of them. Laser is appropriate to form a groove on a waveguide element made of polymer material for coupling multi-mode optical fibers, because an optimal milling precision can be obtained only through laser milling. Meanwhile, mechanical milling tool is appropriate to form a groove on a waveguide element made of silicon material for coupling single-mode optical fibers. Otherwise, mechanical milling after laser milling is used in order to improve milling precision.

Mechanical milling method is advantageous that high milling precision can be obtained and distortion or loss of optical signal transmitted is very low. However, mechanical milling tool such as diamond cutter is easily broken, and its productivity is poor.

On the other side, laser milling method is advantageous in that it takes only a few seconds to form a groove on a waveguide element, and disadvantageous in that milling precision is lower than mechanical milling method.

Figure 9:
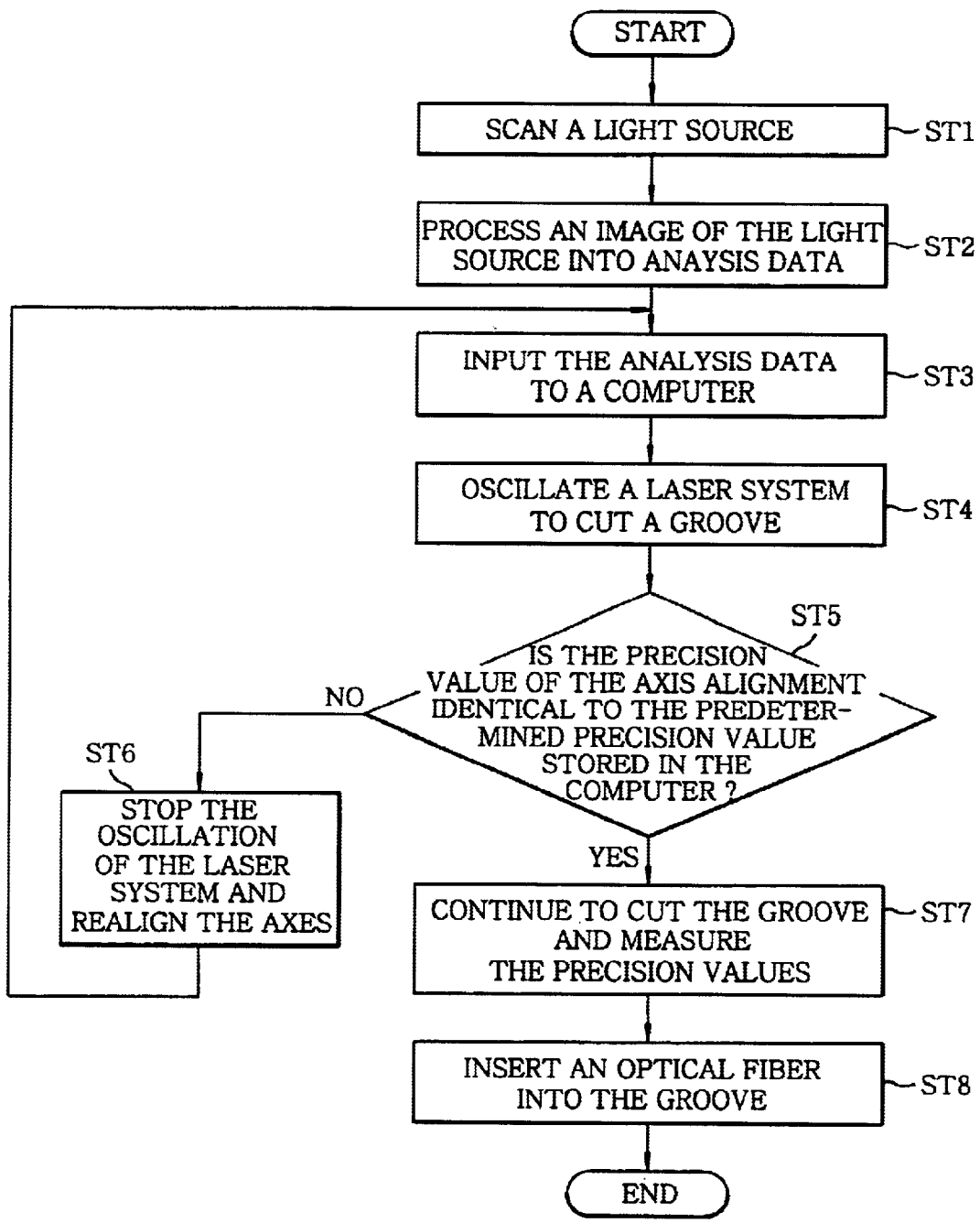
FIG. 9 explains a flowchart of a laser milling process in accordance with the present invention.

FIG. 9 illustrates a flowchart of a process of laser milling in accordance with the present invention.

The method for aligning optical fibers with a waveguide element in accordance with the present invention comprises the steps of: scanning a light source of visible broadband on one side of the waveguide element (step ST1); capturing an image of the light, which is passing through waveguides in the waveguide element, projected on the other side of the waveguide element (step ST2); processing the image to convert it into analysis data and storing the analysis data into a computer (step ST3); oscillating a laser system to form grooves on the one side of the waveguide element, wherein the axes of the grooves are aligned with the axes of the waveguides in accordance with the analysis data (step ST4); comparing a predetermined precision value stored in the computer with a precision value of aligning the axes of the grooves with the axes of the waveguides (step ST5); stopping the oscillation of the laser system when a difference between the predetermined precision value stored in the computer and the precision value of aligning the axes of the grooves with the axes of the waveguides is larger than a threshold value, realigning the axes of the grooves with the axes of the waveguides (step ST6) and then return to step ST3 for inputting the precision value of aligning the axes of the grooves with the axes of the waveguides to the computer; continuing to form the grooves when the difference is less than the threshold, and measuring the precision value of aligning the axes of the grooves with the axes of the waveguides (step ST7); and inserting the optical fibers into the grooves (step ST8).

When the laser system cuts the grooves for inserting optical fibers, an image of the light, which is formed by scanning a light source of visible broadband horizontally or vertically through the waveguides, is captured by a camera, the image is processed to convert it into analysis data, the analysis data are inputted to a computer, and the computer controls the laser system to form the grooves on the one side of the waveguide element by using the analysis data.

The grooves can be formed so that its inner circumference area is deeper than its center area, which can be achieved by increasing the scanning time of laser on its inner circumference area, and mechanical milling can be applied to remove thermal damage by laser milling. In this way, it becomes much easier to interconnect the optical fibers to the waveguide element.

Progress status of laser milling can be monitored by comparing the precision value of aligning the axes of the groove with the axes of the waveguides with the predetermined precision value stored in the computer, stopping the oscillation of the laser system when the difference between the precision value of aligning the axes of the grooves with the axes of the waveguides and the predetermined precision value stored in the computer is larger than the threshold, and realigning the axes of the grooves with the axes of the waveguides.

Further, the monitoring of laser milling process can be achieved by emitting a laser beam of a few pulses lower into the one side of waveguide element, obtaining the precision value of axis alignment by using a light power meter, which has an optical attenuator, on the opposite side of the waveguide element, and adding a function to take the dimensions of the grooves cut.

Referring to accompanying drawings, there will be given the detailed description of a preferred embodiment in accordance with the present invention in the following.

Figure 1:
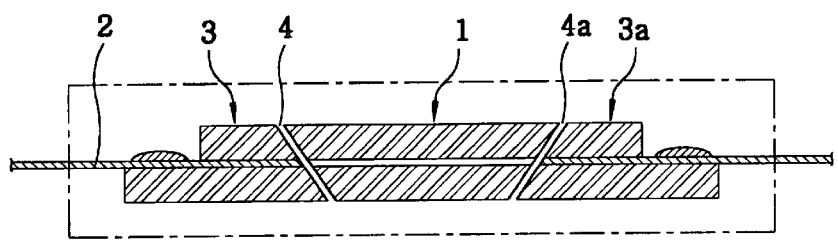
FIG. 1 illustrates a cross sectional view of coupling of an optical fiber and a waveguide in accordance with the prior art.
Figure 2:
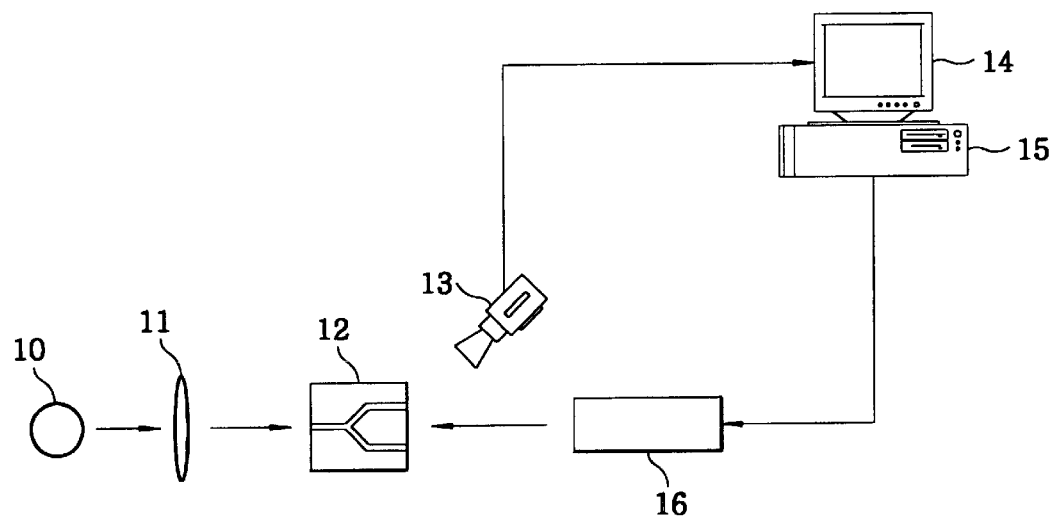
FIG. 2 illustrates a laser milling system in accordance with an embodiment of the present invention.

FIG. 2 illustrates an apparatus in accordance with the present invention for forming grooves for inserting optical fibers by monitoring the progress status of laser milling by using a CCD camera.

The apparatus comprises a light source 10 scanning on the one side of the waveguide element 12, a lens 11, a CCD camera 13 for taking a picture of an image of the light, which is passing through waveguides in the waveguide element 12, projected on the other side of the waveguide element 12 through the lens 11, a computer 15, which has a monitor 14 connected thereto to display signals from the CCD camera 13, to input and output the analysis data for laser milling, and a laser system 16 to form grooves on the one side of the waveguide element 12 in accordance with the analysis data from the computer 15.

The light emitted from the light source 10, which can be a white light or a He—Ne laser of 0.6328 $\mu$m wavelength, is condensed on the opposite side of the waveguide element 12 through the lens 11 of 20 or 40 magnifications, captured by the CCD camera 13 having a microscope, an image of which is displayed on the monitor 14 and inputted into the computer. The computer 15 produces virtual rings matching the external diameters of the optical fibers based on the image inputted. Based on the virtual rings, the laser system 16 oscillates a laser to form grooves for inserting the optical fibers on the center of the waveguides.

The laser from the laser system 16 is emitted with the beam angle of less than 0.5 degrees and axis alignment of 1 $\mu$m, and captured by the CCD camera. When the alignment error is larger than the threshold, the axis of the laser beam is automatically aligned with the axis of the waveguide, and the groove for inserting the optical fiber is formed within a few seconds. Fine particles produced in laser milling can be removed by nitrogen gas strongly blown thereto. In order to determine the optimal axis alignment, instead of using the CCD camera, a light power meter can be used to measure the maximum light power on the opposite side of the waveguide.

In the following, the shapes of the grooves and the waveguides in accordance with the present invention are described in detail.

Figure 3:
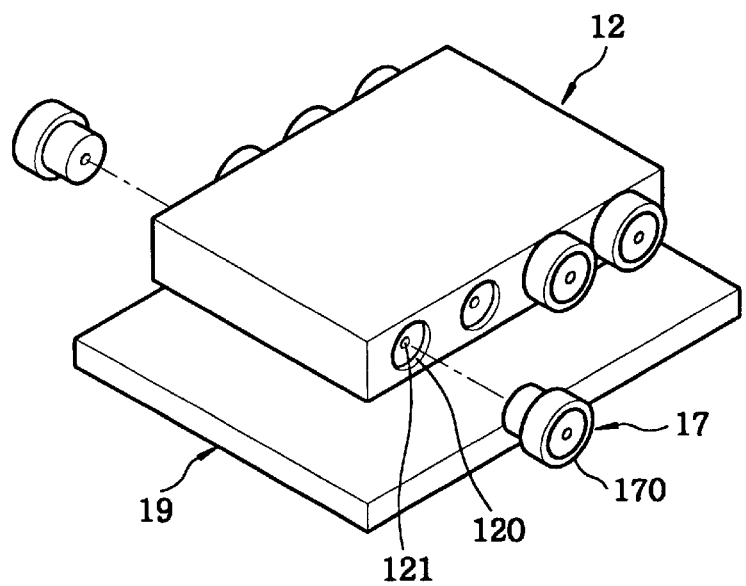
FIG. 3 depicts an exploded perspective view of a waveguide element and optical fibers in accordance with an embodiment of the present invention.
Figure 4:
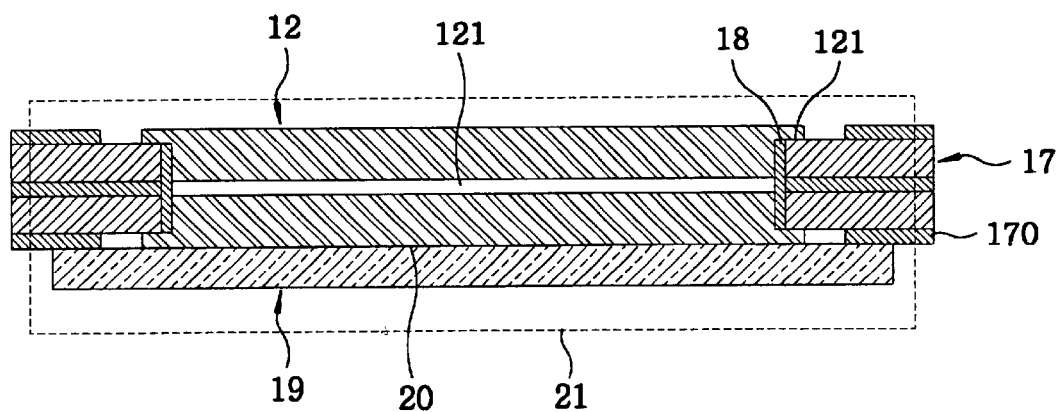
FIG. 4 depicts a cross sectional view of a waveguide and an optical fiber interconnected in accordance with an embodiment of the present invention.

FIG. 3 illustrates an exploded perspective view of a waveguide element and optical fibers. FIG. 4 describes a cross sectional view of a waveguide and an optical fiber interconnected.

As shown in FIG. 3, a groove 121 is formed on either side of each waveguide 120 in the waveguide element 12, which has a diameter of 124 to 126 µm matching the diameter of an optical fiber 17. The end of the optical fiber 17 is cast off its covering 170, cleaved by an optical fiber cutter, covered with optically transmissible adhesive 18, and inserted into the groove 121.

The optically transmissible adhesive 18 is hardened by UV beam scanning thereon. Then, the waveguide element 12 and the covering 170 of optical fiber are attached to a platform 19 by using adhesive 20, wherein the platform 19 is made of glass or ceramic material of low thermal expansibility. Finally, all of the above elements are sealed up in a case 21.

As methods for attaching the waveguide element 12 and the covering 170 of optical fiber to the platform 19, there are adhesion method, soldering method, and melting-by-laser method. In general, adhesion method is cost effective, but its tolerance to environment is poor. Melting-by-laser method is a highly reliable attachment method. However, it can be applied to limited cases, and its cost is relatively high. Which attachment method to apply depends on its reliability, its characteristics for temperature change, material of bodies being attached, and its sensitivity to environmental factors.

Meanwhile, what type of the covering for the optical fiber to be used depends on the type of attachment method. When adhesion method is used, no covering is required. In case of soldering method, the optical fiber should be covered with metal. On the other hand, when melting-by-laser method is used, the optical fiber should be sealed up with a tube supported by metal.

Figure 5:
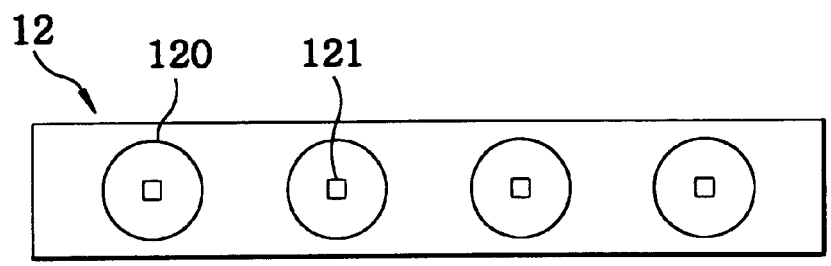
FIG. 5 sets forth a lateral view of a waveguide element, on which grooves for inserting optical fibers are formed, in accordance with an embodiment of the present invention.
Figure 6:
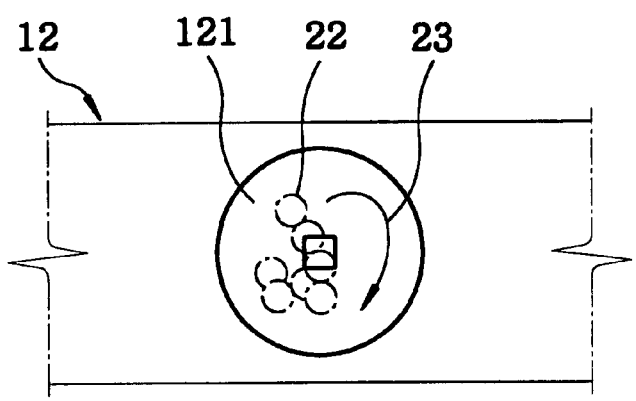
FIG. 6 illustrates a process of forming a groove on a waveguide element in accordance with an embodiment of the present invention.
Figure 7:
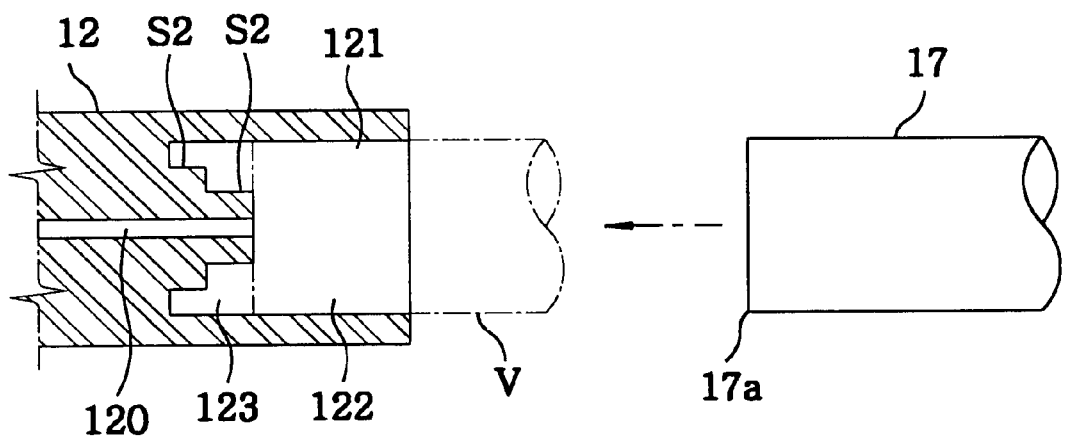
FIG. 7 exhibits a cross sectional view of a groove for inserting an optical fiber in accordance with an embodiment of the present invention.

Referring to FIG. 5 to FIG. 7, a method for forming a groove in accordance with the preferred embodiment of the present invention is described in the following.

FIG. 5 illustrates the one side of waveguide element 12 where grooves for inserting optical fibers are formed. The groove centered on the waveguide is formed to have a diameter of 124 to 126 µm. The depth of the groove should be more than 0.2 mm, and preferably 1 mm for stable attachment and productivity.

FIG. 6 depicts the trace of forming a groove 121 on the one side of the waveguide element. As shown in FIG. 6, circles 22 cut by laser beam have a diameter of 25 µm, the circles 22 are overlapped in the direction of an arrow 23, and finally the groove 121 of a diameter of 124 to 126 µm is formed.

As a laser beam for forming the groove 121, an excimer laser, a light source of pulse wavelength, can be used. The excimer laser can form the groove 121 with high precision, but it requires a long operation time. $CO_2$ laser also can be used to form the groove 121, but its precision is low and it can make damage on the inner circumference of the waveguide to change its refraction index. Nd-YAG laser is most appropriate to form the groove 121. Nd-YAG laser can have a wavelength of 1,062 nm, and preferably a wavelength of 532 nm.

The laser system is controlled by the computer 15 which stops the oscillation of the laser system when the diameter of groove 121 deviates from the predetermined diameter stored in the computer 15.

The groove 121 can have the different depth on any area to improve the interconnection of the optical fiber 17 to the waveguide element 12, which is illustrated in FIG. 7. When Nd-YAG laser is used to cut silicon material, the laser with duration of 2 ns and intensity of 50 $J/cm^2$ can cut the silicon into the depth of 6 µm, and with intensity of 200 $J/cm^2$ into the depth of 18 µm.

In general, the area where the inner wall and the bottom of a groove join causes interference with the object being inserted into the groove. Such a phenomenon also occurs in case that the optical fiber 17 is inserted into the groove 121.

Accordingly, the groove 121 is formed so that its inner circumference area is deeper than its center area, which makes the insertion of the optical fiber into the groove easier because the cut end 17a of the optical fiber 17 does not interfere with the bottom of the groove 121 when the insertion is completed like as the virtual line V.

After forming the groove by the laser is completed, a diamond tool of a diameter of 125 µm can be used to cut the groove, to remove the thermal damage by laser milling and improve the milling precision. Diamond milling after laser milling is effective when used in the production of optical parts used in splitting and coupling of optical wavelength.

Figure 8:
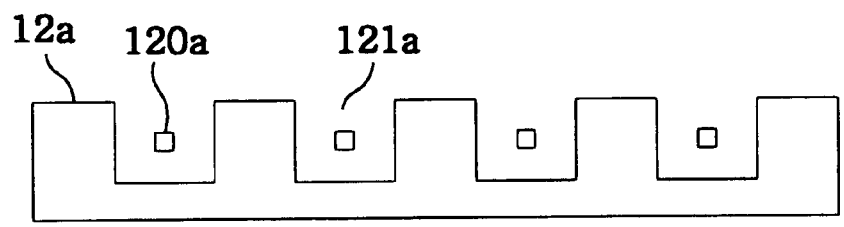
FIG. 8 charts a cross sectional view of U-shaped grooves on a waveguide element in accordance with another embodiment of the present invention.

FIG. 8 describes a waveguide element on the one side of which grooves are formed in accordance with another embodiment of the present invention.

As shown in FIG. 8, a groove 121a can be U or V shaped so that the axis of the groove is aligned with the axis of a waveguide 120a, which can be formed by laser or mechanical tool. Mechanical milling tool is comprised of a diamond cutter, which has an end-milling structure, fixed to an air spindle, a CCD camera the axis of which is aligned with the axis of the spindle, and a transfer device which has a linear stage, a servo motor, a harmonic decelerator, and a transfer axis sensor of laser-linear scale to improve the precision of transfer. Process of mechanical milling comprises the steps of detecting the axis of a waveguide in the waveguide element, aligning the axis of the spindle with the axis of the waveguide, step-feed cutting a groove on the waveguide element, continuing cutting the groove after the CCD camera and computer realigns the axis of the spindle with the axis of the waveguide, and checking the status of the groove cut.

While the invention has been shown and described with respect to the preferred embodiments, it will be understood by those skilled in the art that various changes and modifications may be made without departing from the spirit and scope of the invention as defined in the following claims.

What is claimed is:

1. A method for aligning an optical fiber with a waveguide element, comprising the steps of:

scanning a light source of visible broadband on a first side of the waveguide element, the waveguide element having a waveguide;

capturing an image of the light source on a second side of the wave guide element, the second side being opposite the first side;

processing the image to convert the image into analysis data;

inputting the analysis data into a computer;

forming a groove on the second side of the waveguide element, wherein the computer controls the groove formation and the axis of the groove is aligned with the axis of the waveguide in the waveguide element according to the analysis data; and inserting the optical fiber into the groove.

2. The method of claim 1, wherein the groove has an inner wall and a bottom, the inner wall intersecting the bottom, a portion of the bottom adjacent to the intersection with the inner wall defining an inner circumference area, a portion of the bottom near the center of the groove defining a center area adjacent to the inner circumference area, and the inner circumference area being deeper than the center area.

3. The method of claim 1, further comprising the steps of:

comparing the axes and dimensions of the grooves with the axes and dimensions stored in the computer;

stopping forming the grooves when the differences between the axes and dimensions of the grooves and the axes and dimensions stored in the computer are larger than a threshold; and realigning the axes of the grooves with the axes of the waveguides.

4. The method of claim 2, further comprising the steps of:

comparing the axes and dimensions of the grooves with the axes and dimensions stored in the computer;

stopping forming the grooves when the differences between the axes and dimensions of the grooves and the axes and dimensions stored in the computer are larger than a threshold; and realigning the axes of the grooves with the axes of the waveguides.

5. The method of claim 1, wherein a lens is used for scanning the light source therethrough on the first side of the waveguide element.

6. The method of claim 1, wherein the image of the light source is captured by a CCD camera or a light power meter.

7. A method for aligning optical fibers in a waveguide element, comprising the steps of:

scanning a light source of visible broadband on a first side of the waveguide element, the waveguide element having at least one waveguide;

capturing an image of the scanned light on a second side of the waveguide element, the second side being opposite the first side;

processing the captured image to convert the image into analysis data;

inputting the analysis data into a computer;

using a laser system to mill at least one optical fiber groove in the second side of the waveguide element;

controlling the laser system with the computer to mill the at least one groove; and inserting an optical fiber into the at least one groove after completion of the milling.

8. The method of claim 7, wherein the computer controls the milling by using the analysis data to substantially align the axes of the at least one groove being milled with the axes of the at least one waveguide in the waveguide element.

9. The method of claim 8, further comprising the steps of:

storing in the computer a predetermined precision value of aligning the axes of the at least one groove with the axes of the at least one waveguide;

comparing the predetermined precision value with an actual precision value determined from the analysis data of aligning the axes of the at least one milled groove with the axes of the at least one waveguide;

stopping the milling of the at least one groove;

realigning the axes of the at least one groove with the axes of the at least one waveguide; and continuing the milling of the at least one groove.

10. The method of claim 7, further comprising the steps of milling a second optical fiber groove on the first side of the waveguide element.

11. The method of claim 7, wherein the groove is circular in cross-section.

12. The method of claim 7, wherein the groove is U-shaped or V-shaped.

13. The method of claim 7, further comprising the step of mechanically milling the groove after laser milling for improving milling precision.

14. A method for aligning optical fibers in a waveguide element, comprising the steps of:

scanning a light source of visible broadband on a first side of the waveguide element, the waveguide element having waveguides, wherein the light passes through the waveguide element to a second side of the waveguide element;

condensing the scanned light on the second side of the waveguide element;

capturing an image of the scanned light on the second side of the waveguide element;

processing the captured image to convert the image into analysis data;

inputting the analysis data into a computer;

oscillating a laser to form optical fiber grooves on the second side of the waveguide element;

controlling the laser with the computer to form the grooves, the computer using the analysis data to control the laser; and inserting optical fibers into the grooves after completion of the milling.

15. The method of claim 14, wherein the light is condensed on the second side of the waveguide element through a lens.

16. The method of claim 14, wherein the grooves are formed by overlapping a plurality circles cut into the waveguide element by the laser.

17. The method of claim 14, further comprising the step of stopping the oscillation of the laser when the diameter of the grooves being formed by the laser deviates from a predetermined diameter stored in the computer.

* * * * *